United States Patent [19]

Abboud

[11] Patent Number: 5,747,426

[45] Date of Patent: May 5, 1998

[54] HIGH PERFORMANCE MAGNETIC BEARING SYSTEMS USING HIGH TEMPERATURE SUPERCONDUCTORS

[75] Inventor: Robert G. Abboud, Barrington Hills, Ill.

[73] Assignee: Commonwealth Research Corporation, Chicago, Ill.

[21] Appl. No.: 483,458

[22] Filed: Jun. 7, 1995

[51] Int. Cl.[6] .................................................. H02K 7/09
[52] U.S. Cl. ........................... 505/166; 310/90.5; 74/572
[58] Field of Search ............................. 310/90.5; 74/572; 505/166, 785

[56] References Cited

U.S. PATENT DOCUMENTS

| 3,597,022 | 8/1971 | Waldron | 308/10 |
|---|---|---|---|
| 3,954,064 | 5/1976 | Minovitch | 104/138 R |
| 4,511,190 | 4/1985 | Caye et al. | 308/10 |

(List continued on next page.)

FOREIGN PATENT DOCUMENTS

| 0 467 341A1 | 1/1992 | European Pat. Off. . |
|---|---|---|
| 0 526 325A1 | 2/1993 | European Pat. Off. . |
| 0 558 818A1 | 9/1993 | European Pat. Off. . |
| 0 575 619A1 | 12/1993 | European Pat. Off. . |
| 0 695 027A1 | 1/1996 | European Pat. Off. . |
| 2271441 | 12/1975 | France . |
| 3249423 | 4/1984 | Germany . |
| 58-9533 | 1/1983 | Japan . |
| 58-217840 | 12/1983 | Japan . |
| 60-2646 | 1/1985 | Japan . |
| 62-285651 | 12/1987 | Japan . |
| 1-234618 | 9/1989 | Japan . |
| 3-103086 | 4/1991 | Japan . |
| 4-282050 | 10/1992 | Japan . |
| 5-172145 | 7/1993 | Japan . |
| 5-240248 | 9/1993 | Japan . |
| 5-252674 | 9/1993 | Japan . |
| 6-81845 | 3/1994 | Japan . |
| 6-200942 | 7/1994 | Japan . |
| 6-313427 | 11/1994 | Japan . |
| 6-323334 | 11/1994 | Japan . |
| 7-123613 | 5/1995 | Japan . |
| 7-217654 | 8/1995 | Japan . |
| 7-229517 | 8/1995 | Japan . |
| 7-277730 | 10/1995 | Japan . |
| 7-293564 | 11/1995 | Japan . |
| 8-107638 | 4/1996 | Japan . |

(List continued on next page.)

OTHER PUBLICATIONS

Bornemann et al., Concepts of Flywheels for Energy Storage Using Autostable High-Tc Superconducting Magnetic Bearings, in Second International Symposium on Magnetic Suspension Technology, Seattle, Washington, Aug. 11–13, 1993.

Bornemann et al., Melt-Textured Y–Ba–Cu–O and its Applications to Autostable Superconducting Magnetic Bearings, in Advances in Superconductivity (Springer Vertag Tokyo), Jan., 1994.

Chen et al., Hybrid High Tc Superconducting Magnetic Bearings for Flywheel Applications, in Proceedings of the Sixth U.S./Japan Workshop On High Tc Superconductors, p. 77, 1994 (World Scientific).

Marinescu et al., Passive Stabilization of a Magnetic Radial Bearing by Superconductors, IEEE Transactions on Magnetics, vol. 25, Sep., 1989.

*Primary Examiner*—Clayton E. LaBalle
*Assistant Examiner*—Timothy A. Williams
*Attorney, Agent, or Firm*—Brinks Hofer Gilson & Lione; William H. Frankel; Chen Wang

[57] ABSTRACT

A magnetic bearing apparatus and a method for providing at least one stabilizing force in a magnetic bearing structure with a superconducting magnetic assembly and a magnetic assembly, by providing a superconducting magnetic member in the superconducting magnetic assembly with a plurality of domains and arranging said superconducting magnetic member such that at least one domain has a domain C-axis vector alignment angularly disposed relative to a reference axis of the magnetic member in the magnetic assembly.

41 Claims, 3 Drawing Sheets

U.S. PATENT DOCUMENTS

| | | | |
|---|---|---|---|
| 4,589,707 | 5/1986 | Caye et al. | 310/90.5 |
| 4,797,386 | 1/1989 | Gyorgy et al. | 505/1 |
| 4,879,270 | 11/1989 | Maxfield et al. | 505/1 |
| 4,879,537 | 11/1989 | Marshall et al. | 335/216 |
| 4,886,778 | 12/1989 | Moon et al. | 505/1 |
| 4,939,120 | 7/1990 | Moon et al. | 505/1 |
| 4,939,308 | 7/1990 | Maxfield et al. | 505/1 |
| 4,956,336 | 9/1990 | Salama et al. | 505/1 |
| 5,053,385 | 10/1991 | Capone et al. | 505/1 |
| 5,061,679 | 10/1991 | Weeks, II | 505/1 |
| 5,113,164 | 5/1992 | De Wames et al. | 335/216 |
| 5,117,139 | 5/1992 | Flom et al. | 310/90.5 |
| 5,126,317 | 6/1992 | Agarwala | 505/1 |
| 5,126,611 | 6/1992 | Armstrong et al. | 310/90.5 |
| 5,130,588 | 7/1992 | Armstrong et al. | 310/90.5 |
| 5,159,219 | 10/1992 | Chu et al. | 310/90.5 |
| 5,177,387 | 1/1993 | McMichael et al. | 310/90.5 |
| 5,196,748 | 3/1993 | Rigney | 310/90.5 |
| 5,214,981 | 6/1993 | Weinberger et al. | 74/573 R |
| 5,220,232 | 6/1993 | Rigney, II et al. | 310/90.5 |
| 5,245,270 | 9/1993 | Akiyama | 322/4 |
| 5,254,528 | 10/1993 | Takahata | 505/1 |
| 5,256,637 | 10/1993 | Rao | 505/1 |
| 5,256,638 | 10/1993 | Weinberger et al. | 505/1 |
| 5,270,601 | 12/1993 | Rigney, II | 310/90.5 |
| 5,302,874 | 4/1994 | Pinkerton | 310/90.5 |
| 5,306,697 | 4/1994 | Salama et al. | 505/126 |
| 5,310,705 | 5/1994 | Mitilitsky et al. | 505/211 |
| 5,313,130 | 5/1994 | Shibayama et al. | 310/90.5 |
| 5,314,868 | 5/1994 | Takahata et al. | 505/166 |
| 5,330,967 | 7/1994 | Takahata et al. | 505/166 |
| 5,334,965 | 8/1994 | Dolgin | 335/216 |
| 5,398,571 | 3/1995 | Lewis | 74/572 |
| 5,409,892 | 4/1995 | Hayashi et al. | 505/451 |
| 5,434,125 | 7/1995 | Ogawa et al. | 505/126 |
| 5,462,922 | 10/1995 | Doi et al. | 505/785 |
| 5,479,059 | 12/1996 | Weinberger | 310/90.5 |
| 5,525,849 | 6/1996 | Ito et al. | 310/90.5 |
| 5,554,583 | 9/1996 | Hull et al. | 505/166 |

FOREIGN PATENT DOCUMENTS

| | | |
|---|---|---|
| WO 92/14271 | 8/1992 | WIPO |
| WO 93/01602 | 1/1993 | WIPO |
| WO 93/10367 | 5/1993 | WIPO |
| WO 93/11372 | 6/1993 | WIPO |
| WO 93/16294 | 8/1993 | WIPO |
| WO 94/20893 | 1/1994 | WIPO |
| WO 95/23298 | 8/1995 | WIPO |
| WO 95/02271 | 9/1995 | WIPO |
| WO 95/32541 | 11/1995 | WIPO |

HIGH PERFORMANCE MAGNETIC BEARING SYSTEMS USING HIGH TEMPERATURE SUPERCONDUCTORS

CONTRACTUAL ORIGIN OF THE INVENTION

This invention was made with Government support under ANL-ACK-85810 under CONTRACT NO. W-31-109-ENG-38 awarded by the Department of Energy. The Government has certain rights in this invention.

BACKGROUND OF THE INVENTION

The present invention relates generally to magnetic bearing designs. More particularly, the present invention relates to passive bearing systems having a particular alignment of at least one domain C-axis vector of a superconducting assembly with regard to a reference axis of a magnetic assembly. The domain alignment is capable of providing a stabilizing force against velocities which are not parallel with the desired movement of the levitated bearing assembly.

A magnetic bearing structure is a passive bearing system wherein one bearing assembly is levitated by at least one other bearing assembly. A known magnetic bearing structure is a superconducting magnetic bearing which includes a combination of permanent magnets and high-temperature superconductors (HTSs). General types of superconducting magnetic bearings include linear magnetic bearings and rotary magnetic bearings. Linear magnetic bearing systems include a first magnetic assembly (carrier assembly) levitated by a second magnetic assembly (guideway assembly) wherein the carrier assembly is capable of linear motion relative to and guided by the guideway assembly. HTS material may be used in either the carrier assembly or the guideway assembly. In electrodynamic levitation (EDL) magnetically levitated vehicles (Mag-Lev), the carrier assembly usually contains the HTS material (Moon, Francis C., *Superconducting Levitation*, 27 (John Wiley & Sons Inc. 1994)). A third type of superconducting magnetic bearings is a bearing system having substantially no relative movement between the bearing assemblies. This type of bearing provides a stable suspended platform for sensitive instruments. Applications of this third type of bearing include providing platforms for optical equipments and stages for electron microscopes.

Applications of linear magnetic bearings include linear conveyor pallets for clean room or vacuum processing system. Rotary magnetic bearings include, for example, a levitated magnetic assembly capable of rotation relative to at least one other magnetic assembly (stator assembly). In general, rotary magnetic bearings include journal bearings and thrust bearings. Journal bearings can include a levitated magnetic assembly inside a stator assembly made of HTS and having the configuration of a hollow cylinder. Thrust bearings can include a levitated magnetic assembly above a stator assembly made of HTS material.

Applications of rotary magnetic bearings include flywheel energy storage devices, gyroscopes, high-speed machine tools, angular momentum wheels for spacecraft, rotary scanners for optical and infrared devices, high-speed optical shutters, centrifuges, micromachine bearings, cryocooler turbines, cryopumps for rockets, space vehicles, ground-based systems, aircraft engine bearings, underground gas pipeline pumps, high-speed spindles for textile manufacturing, particle beam choppers and computer disk storage devices. The bearing can operate in different orientations of gravity: in a thrust bearing, the magnetic assembly can be levitated over the stator assembly as discussed above, or the magnetic assembly could be suspended below the stator assembly.

High-temperature superconducting bearings are noted for long life, reliability and low parasitic bearing power loss. Type II superconducting materials commonly are used for rotary bearing systems. One particular type of Type II superconducting material is a 1-2-3 phase Yttrium-Barium-Copper oxide (YBCO) melt-textured material such as $YBa_2Cu_3O_x$. In Type II superconducting materials such as YBCO, each crystal domain is divided into 3 orthogonal axes denoted A, B and C. (see, e.g., Moon, Francis C., Superconducting Levitation, 90, FIG. 3–11 (John Wiley & Sons Inc. 1994)). Typically, the maximum current that can be supported in the superconducting state in each plane is called the critical current or $J_c$. This $J_c$ is a function of the domain plane, temperature, and to some extent, the magnetic field. This critical current in a particular superconducting plane, A–B, A–C or B–C, is essentially the same in either direction. The magnetic vector is orthogonal to the current in the plane, obeying the "right-hand-rule" of magnetics. The magnetic vector direction is therefore defined as orthogonal to the superconducting current and in the direction according to the right-hand-rule. The maximum magnetic field vector is the vector which occurs when the domain plane current is at $J_c$. The domain C-axis vector refers to the magnetic field vector which is parallel to the domain's C direction resulting from a super-current of $J_c$ in the A–B plane. Materials such as HTS YBCO tend to have an order of magnitude improvement of JC in the A–B plane as opposed to the A–C or B–C planes. Since the magnetic vector is orthogonal to the super-current, the maximum magnetic mirroring and pinning occurs along the C-axis. This is also the direction that provides the greatest energy dissipation during field accelerations in the C direction. It is therefore concluded that maximum dampening and stiffness can be achieved by aligning the C-axis along the direction of motion to be sprung or damped.

Presently, the industry has expended extensive effort in the manufacture of HTS bearing stator or guideway materials, such as YBCO, to align the C-axis of the HTS domain with the normal direction of the bearing thrust face (vertical alignment strategy). See, for example, U.S. Pat. No. 5,214,981 issued Jun. 1, 1993 to Weinberger et al. This effort is typically combined with an effort to produce the largest possible grain domains in the melt textured product. The purpose of this approach is to give the highest lift possible since most HTS bearing applications are specified with thrust load requirements.

This vertical alignment strategy was previously required principally because of the low $J_c$ of the HTS material available. As higher performance material has become available, not all of the potential bearing thrust capability is required for lift. Additionally, many HTS bearing applications are being augmented with other non-HTS support such as zero stiffness permanent magnet systems. The additional thrust or lift margin now can be used for dynamic rotor management. Because there has been little high speed experience with HTS bearings to date, the dynamic requirements of HTS bearings for use with high speed rotors have not been fully appreciated.

Disadvantages of the vertical alignment strategy include low dynamic stiffness of the bearing, low dynamic dampening, and the cost penalty associated with the uni-grain orientation HTS manufacture. For example, in a thrust bearing system wherein a permanent magnetic rotor with a radius r and a mass M is rotating above a superconducting magnetic stator, there exists a vibrating force function $F(x,\phi)$ along coordinates x and $\phi$ having components as indicated in Equation I:

$$F(x,\phi)=(M/g)(d^2x/dt^2)+c_1(dx/dt)+k_1x+r\phi(c_2(dx/dt)+k_2x) \quad \text{(EQUATION I)}$$

wherein:

g=force of gravity, $c_1$=the axial damping constant of the stator, $k_1$=axial stiffness constant of the stator, $c_2$=the radial damping constant of the stator, $k_2$=the radial stiffness constant of the stator.

While the vertical alignment strategy may provide some dynamic support, its effect on the values of $c_1$, $k_1$ and $c_2$ components is minimal. Such vibration displacements result in a loss of energy from the bearing system.

SUMMARY OF THE INVENTION

The present invention relates to a magnetic bearing apparatus and a method for manufacturing a magnetic bearing structure which provides a stabilizing force against velocities which are not parallel with the desired movement of the levitated bearing assembly.

The present invention relates to a structure for magnetic bearings including a superconducting assembly having at least one superconducting magnetic member having a support face and containing a plurality of domains which include respective domain C-axis vectors. The magnetic bearing structure further includes a magnetic assembly having at least one magnetic member having a thrust face opposing the support face and including a reference axis having a direction normal to said thrust face. The superconducting magnetic member contains domains wherein at least one domain C-axis vector is angularly disposed relative to the reference axis of the magnetic member. This angular disposition provides a stabilizing force against vibration displacements of the magnetic member.

The present invention also relates to a method for providing at least one stabilizing force in a magnetic bearing system by providing a superconducting magnetic member in a superconducting assembly with a plurality of domains and arranging the superconducting magnetic member such that at least one domain has a domain C-axis vector alignment angularly disposed relative to the reference axis of the magnetic member.

The present invention is especially useful in an energy storage system to provide efficient energy storage. Losses associated with the bearing system are typically the primary loss mechanism in rotating storage machines. Loss of the stored energy to nonuseful work represents a cost penalty to the operation of these devices.

The invention itself, together with further objects and attendant advantages, will best be understood by reference to the following detailed description, taken in conjunction with the accompanying drawings.

DESCRIPTION OF THE PREFERRED EMBODIMENTS

The present invention relates to a bearing structure apparatus and a method for manufacturing a magnetic bearing structures that provides a stabilizing force against vibration displacements or velocities which are not parallel with the desired movement of the levitated bearing assembly.

Figure 1:
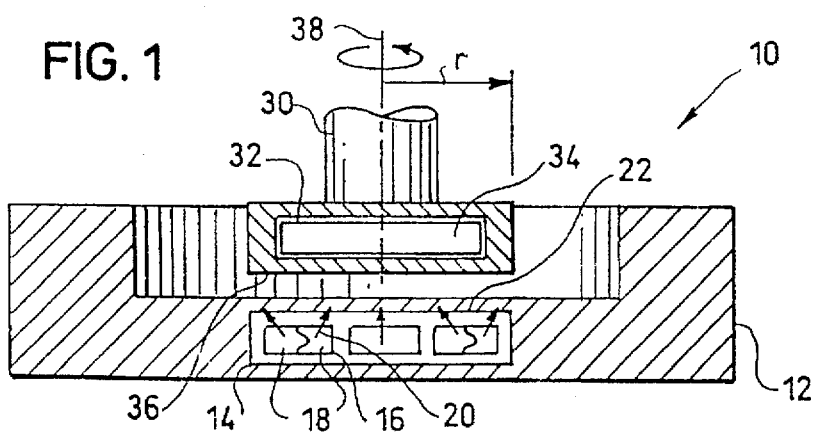
FIG. 1 is a schematic diagram of a cross section of a thrust bearing structure in accordance with the present invention.

As shown in FIG. 1, a thrust bearing structure 10 in accordance invention includes a superconducting assembly 12 and a magnetic assembly 30. The magnetic assembly 30 is the rotary element or the levitated assembly of the thrust bearing structure 10 and is suspended by the superconducting assembly 12 which acts as the stator element. Superconducting assembly 12 includes a superconducting magnetic member 14 that contains one or more superconducting magnetic elements 16. Each superconducting magnetic element 16 contains one or more domains 18. Each domain 18 includes an arrow 20 denoting the direction of the domain C-axis vector. The magnetic assembly 30 includes a magnetic member 32 containing one magnetic segment 34 made of a permanent magnet material. The magnetic segment 34 may also be made of electromagnetic members, or a combination of permanent magnet material and electromagnetic members. The magnetic assembly 30 is suspended by the superconducting assembly 12 such that the thrust face 36 of the magnetic member 32 opposes the support face 22 of superconducting magnetic member 14. The reference axis 38 of the magnetic member 32 is perpendicular to the thrust face 36. In the thrust bearing structure 10, shown in FIG. 1, the reference axis 38 is parallel to the rotation axis of the levitated magnetic assembly 30.

The superconducting assembly 12 may contain permanent magnetic members or electromagnetic members (not shown) in addition to the superconducting magnetic member 14. Alternatively, the superconducting magnetic member 14 may contain one superconducting magnetic element having a plurality of domains 18 as an alternative to containing a plurality of superconducting magnetic elements 16 as shown in FIG. 1. A second alternative construction may be a superconducting magnetic member 14 containing superconducting magnetic elements 16 each having one domain 18. A third alternative construction may be a superconducting magnetic member 14 containing some superconductive magnetic elements 16 having one domain 18 and other superconductive magnetic elements 16 having a plurality of domains 18.

The superconducting magnetic member 14 preferably is made of a Type II high-temperature superconducting material. Generally, these materials have critical temperatures ($T_c$) above 30 K. Examples of Type II high-temperature superconducting materials include high-temperature superconducting oxides such as barium-lanthanum-copper oxides (Ba—La—CuO), strontium-lanthanum-cooper oxides (Sr—

La—CuO), yttrium-barium-copper oxides (YBCO), mercury-based cuprates (Hg—Ba—CaCuO), thallium-based cuprates (Tl—Ba—Ca—CuO) and bismuth-strontium-calcium-copper oxides (BSSCO). Thus, for example, Type II superconducting materials which can be used to make up magnetic member 14 can be selected from $La_{1-x}Ba_xCuO_4$, $(La_{1-x}Ba_x)_2CuO_{4-y}$, $La_{2-x}Sr_xCuO_4$, $YBa_2Cu_3O_{7-\delta}$, $YBa_2Cu_{3.5}O_{7+x}$, $YBa_2Cu_4O_{8+x}$, $Bi_2(Sr,Ca)_{3-x}Cu_2O_{9-y}$, $Bi_2(Sr,Ca)_{3-x}Cu_2O_{9-y}$, $Bi_4(Sr,Ca)_6Cu_4O_{16+x}$, $Bi_2Sr_3Ca_3Cu_2O_{8+x}$, $Tl_2Ba_2CaCu_2O_{10+\delta}$, $Tl_2Ba_2CaCu_3O_{8+\delta}$ and $HgBa_2Ca_2Cu_3O_{6+\delta}$. Preferably, the superconducting member 14 is made of a material selected from $La_{1.85}Ba_{0.15}CuO_4$, $La_{1.85}Sr_{0.5}CuO_4$, $YBa_2Cu_3O_7$, $Bi_2Sr_2CaCu_2O_8$, $Bi_2Sr_2Ca_2Cu_3O_{10}$, $Tl_2Ba_2CaCu_2O_8$, $Tl_2Ba_2Ca_2Cu_2O_{10}$ and $HgBa_2Ca_2Cu_3O_{6+\delta}$. Most preferably, the superconducting magnetic member 14 is made of $YBa_2Cu_3O_7$.

The magnetic assembly 30 may contain a superconducting magnetic material in addition to the permanent magnet material. The magnetic assembly 30 may have any conventional configuration of a rotary element in a thrust bearing system. Typically, the magnetic assembly 30 is cylindrical- or disc-shaped. The superconducting assembly 12 may have a configuration corresponding to that of the magnetic assembly 30. For example, a disc-shaped magnetic assembly 30 is levitated by a corresponding disc-shaped superconducting assembly 12.

In the thrust bearing structure 10, vibration displacements includes vibration displacements such as those expressed by Equation I. In other words, vibration displacements include displacements of the magnetic member 32 which are not parallel with the angular displacements associated with the rotation of the magnetic member 32 around a fixed axis of rotation. Thus, for example, the vibration displacements may include displacements resulting from rotor imbalances. These can manifest themselves as rotor precessions, vibrations, or oscillations.

Figure 2:
FIG. 2 is a schematic diagram of the angular disposition of a domain C-axis vector relative to the reference axis in FIG. 1.

According to the present invention, a stabilizing force to eliminate vibration displacements is provided by superconducting magnetic elements 16 having at least one domain C-axis vector 20 angularly disposed with respect to the reference axis 38. As shown in FIG. 2, a domain C-axis vector 20 is angularly disposed with respect to the reference axis 38 when the three-dimensional angular disposition $\alpha$ satisfies the formula $-90°<\alpha<90°$.

The present invention is especially useful for providing an efficient bearing structure for an energy storage system. Energy storage systems employing flywheels, in both cylinders and disk configurations, require advanced non-linear dampening behavior for high speed operation. This is particularly true of operation at super critical speeds. The bearing dampening of this configuration will be very non-linear, with continually increasing energy dissipation as the displacement increases.

Figure 3:
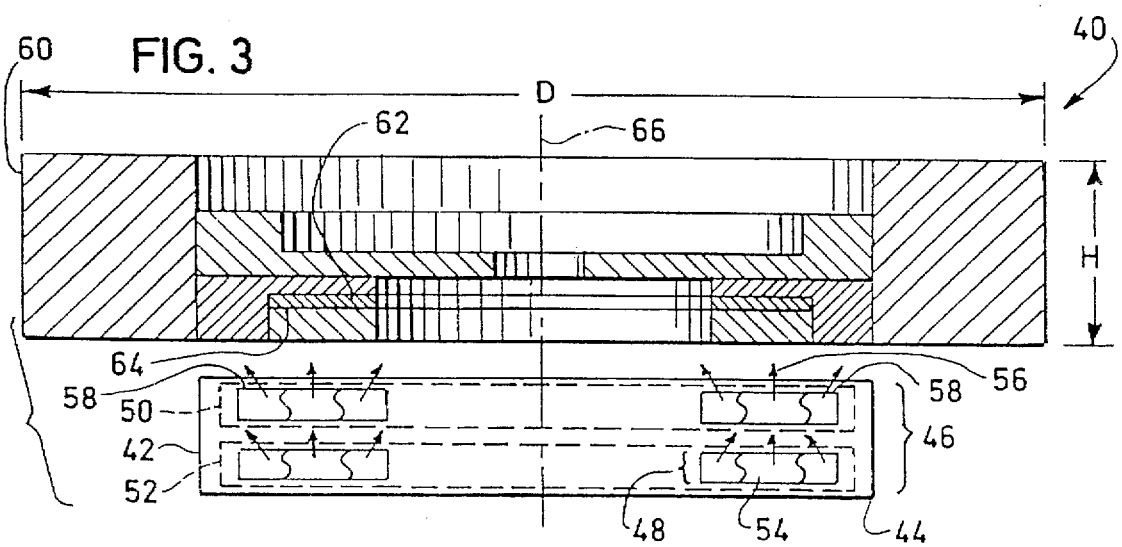
FIG. 3 is a schematic diagram of a cross section of a bearing structure for an energy storage system in accordance with the present invention.

As shown in FIG. 3, bearing structure 40 for an energy storage system includes a stator assembly 42 and a rotor assembly 60. The rotor assembly 60 is a flywheel containing magnetic member 62 made of permanent magnet material. The stator assembly 42 includes a cryochamber 44 for cooling the HTS material, containing a superconducting magnetic member 46 having a plurality of superconducting magnetic elements 48 to form a circular array of superconducting magnetic elements 50 or 52. The first array of superconducting magnetic elements 50 is tiled over the second array of superconducting elements 52 to increase the overall thickness and performance of the stator assembly. This tiling also has the effect of smoothing the statistical variations of each domain vector.

Superconducting magnetic elements 48 may be laterally positioned to form a first circular array of superconducting magnetic elements 50 tiled over a second circular array 52. Alternatively, superconducting magnetic elements 48 may form a plurality of arrays wherein the elements in a first array are positioned in a staggered layout relative to the elements in a second array to form a brick wall profile. Notwithstanding the number of arrays and the layout of the superconducting magnetic elements, the support face 58 of the superconducting magnetic member 46 opposes the thrust face 64 of the magnetic member 62.

The rotor assembly 60 is disc-shaped and has magnetic member 62 made of permanent magnets. Each superconducting magnetic element 48 may contain one or more domains 54. Preferably, the superconducting magnetic element 48 contains a plurality of domains 54. A more preferred number of domains in the superconducting magnetic element 48 is between three and ten. Magnetic member 62 may contain one or more magnetic segments (not shown).

A stabilizing force is provided by the present invention by arranging domains 54 in the superconducting magnetic member 46 so that the domain C-axis vectors 56 are angularly disposed with respect to the reference axis 66. In a preferred embodiment of the present invention, the superconducting magnetic member 14 contains domain C-axis vectors 20 having a spectrum of angular dispositions.

Figure 4:
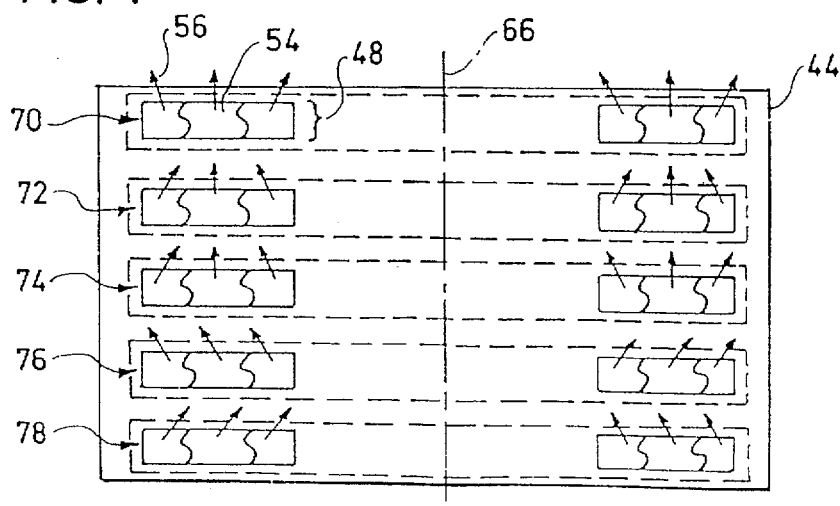
FIG. 4 is a schematic diagram of five modes of alignment of domain C-axis vectors in the bearing structure described in FIG. 3.

FIG. 4 shows a representative sample of five possible combinations of angular dispositions in a single array superconducting magnetic member 70, 72, 74, 76 or 78 in a cryochamber 44 for the bearing structure 40 of FIG. 3. The angular disposition of each domain C-axis vector 56 as has been shown in FIG. 4 may vary between −90° and 90° of the reference axis 66. Preferably, the angular dispositions of the domain C-axis vectors 56 vary between about −30° and about 30° from the reference axis 66. The preferred combinations of angular dispositions are represented by the first, second and third superconducting magnetic members 70, 72 and 74. The more preferred combination is represented by the third superconducting magnetic member 74. Although angular dispositions of the domain C-axis vectors 56 have been described in two dimensions, it should be understood that the angular dispositions of domain C-axis vectors 56 may extend in a multitude of directions within three dimensions.

As shown in FIG. 4, the alignment of the domain C-axis vectors 56 may be azimuthally symmetrical or azimuthally asymmetrical with respect to the reference axis 66 along any radius of the superconducting magnetic member 46. In a preferred embodiment of the present invention, the "vectorial sum direction" along any radius of the superconducting magnetic member 46 is azimuthally symmetric in order that the bearing response forces are symmetric in three dimensions. The vectorial sum direction is the resultant direction of the sum of all the C-axis vectors 56 along a radius of the superconducting magnetic member 46. Thus, for example, the vectorial sum direction may be the direction of one C-axis vector 58 if the superconducting member 46 contains only one domain 54 along a particular radius. In a more preferred embodiment of the present invention, the azimuthally symmetric vectorial sum direction is parallel with the slope of the flux lines (not shown) of the magnetic member 62 where the flux lines intersect the support face 58. This configuration provides maximum stiffness and dampening.

Alternatively, domain C-axis vectors 20 may be aligned so that the angular dispositions vary as a function of the radius of superconducting magnetic member 14. In addition, the magnetic member 14 may contain two or more domain C-axis vectors 20 having a "vectorial sum angle" $\Theta_1$ and having a statistically normal distribution with a mean distribution value substantially equal to $\Theta_1$, wherein about 90% of the domain C-axis vectors 20 have an angular disposition $\alpha$ that satisfies the formula $\Theta_1-15°\leq\alpha\leq\Theta_1+15°$. A vectorial sum angle is the angle of the vectorial sum direction relative to the reference axis 38. Preferably, about 90% of the domain C-axis vectors 20 have an angular disposition $\alpha$ that satisfies the formula $\Theta_1-5°\leq\alpha\leq\Theta_1+5°$.

In another alternative arrangement, two or more domain C-axis vectors 20 having a vectorial sum angle $\Theta_2$ may be randomly distributed, wherein the domain C-axis vectors 20 have an angular disposition $\alpha$ that satisfies the formula $\Theta_2-90°\leq\alpha\leq\Theta_2+90°$. Preferably, the domain C-axis vectors 20 have an angular disposition $\alpha$ that satisfies the formula $\Theta_2-10°\leq\alpha\leq\Theta_2+10°$.

In another alternative alignment method, the domains 54 can be arranged such that along any diameter of the superconducting magnetic member 46, the vectorial sum direction of the domain C-axis vectors 56 is parallel with the direction of the required control force. For example, the superconducting magnetic member 76 or 78 may contain domains 54 with a domain vector arrangement wherein the domain C-axis vectors 56 form a cone. In these designs, the rotor assembly 60 is disposed in a magnetic well and self positions to achieve a optimal energy configuration. Unlike the conventional approach in which the domain C-axis vectors 56 are generally parallel to the reference axis 66, this approach may add static hoop stresses to the bearing magnet which must be accounted for in the bearing magnet design. Nevertheless, other non-symmetric alignments are possible and may be desirable in certain cases.

Normally, to align the domain C-axis vectors 56, each HTS pellet is machined and oriented based on its finished response domain C-axis vector 56. Thus, arrangement of the domains 54 in the superconducting magnetic member 46 initially involves determining the distribution of the direction of the C-axis vectors 56 in each superconducting magnetic element 48.

A first method of this characterization is individual measurement of the C-axis vector of each superconducting magnetic element 48. A second method of characterization is measurement of a representative sample of the superconducting magnetic elements 48 at different oven locations, because superconducting magnetic elements 48 grown within a certain temperature range in the oven tend to have similar distribution of the domain C-axis. A third method of characterization involves measuring a sample of superconducting magnetic elements 48 from a batch and machining (or mounting) all the pellets in the batch based on the expected direction for the domain C-axis as determined from the samples. The preferred methods of characterization are the second and third methods. The use of superconducting magnetic elements containing a plurality of domains makes the accuracy of the characterization much less critical than when single domain superconducting magnetic elements are used. In addition, allowing for smaller grain size and an increased number domain C-axis vector distribution, the overall costs of HTS material production will be reduced.

Thus, a preferred method of obtaining the desired domain C-axis vector direction in a particular section of the stator assembly 42 is by providing preferentially selected distribution centered on the desired domain C-axis vector direction. This provides greater control over the direction, but requires characterization and care in assembly.

An alternative to the preferentially selected distribution of domain C-axis vector 56 is to select a plurality of domains having a random distribution of domain C-axis vector 56 varying over a specified angle $\beta$ from the desired domain C-axis vector direction so that the vectorial sum direction of the random distribution approximates the desired domain C-axis vector direction. While the desired angle $\beta$ could vary from 0° to 180°, a preferred angle $\beta$ is between 20° and 30°.

The current process of making melt-textured HTS material is well documented in the current literature. Most of the effort is concentrated on the growth of single crystal pellets with significant effort expended to prevent spontaneous nucleation of additional domains in the pellet. This invention will allow for the use of pellets with these additional domains, which are currently considered less than optimum.

Moreover, the stabilizing force of the present invention also counteracts conical and cylindrical precessions. In a bearing structure 40 with a rotor assembly 60 with a cylinder configuration and having a ratio of the height and diameter of the rotor assembly 60, H and D respectively as shown in FIG. 3, between about 3 and about 6, the cylinder typically operates as a stiff rigid body but tends to gyroscopically precess. This includes both conical and cylindrical motions, although the conical motions predominates because as the frequency of precession is a function of the rotor's angular speed. The forcing function of the conical precession is a direct result of the rotor imbalance. The present invention provides a stabilizing force which substantially decreases the rotor's response to this forcing function.

Figure 5:
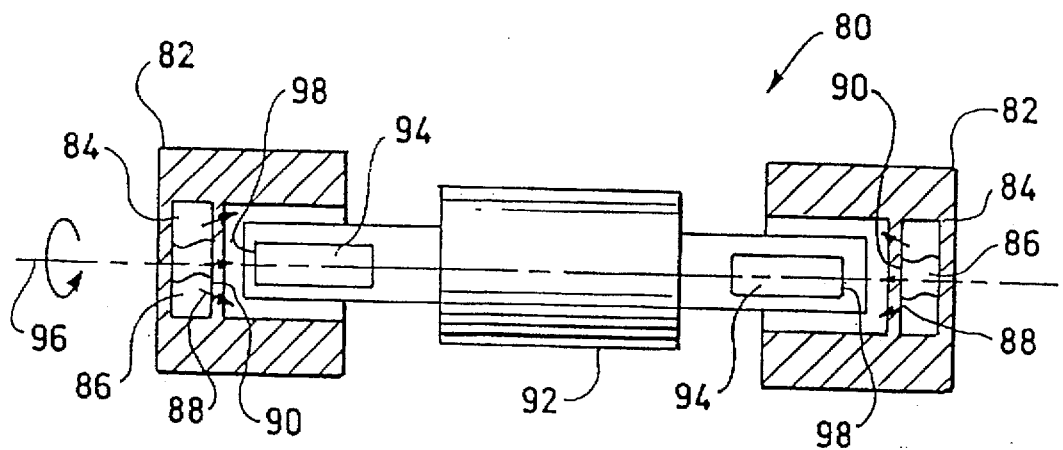
FIG. 5 is a schematic diagram of a cross section of a journal bearing structure in accordance with the present invention.
Figure 6:
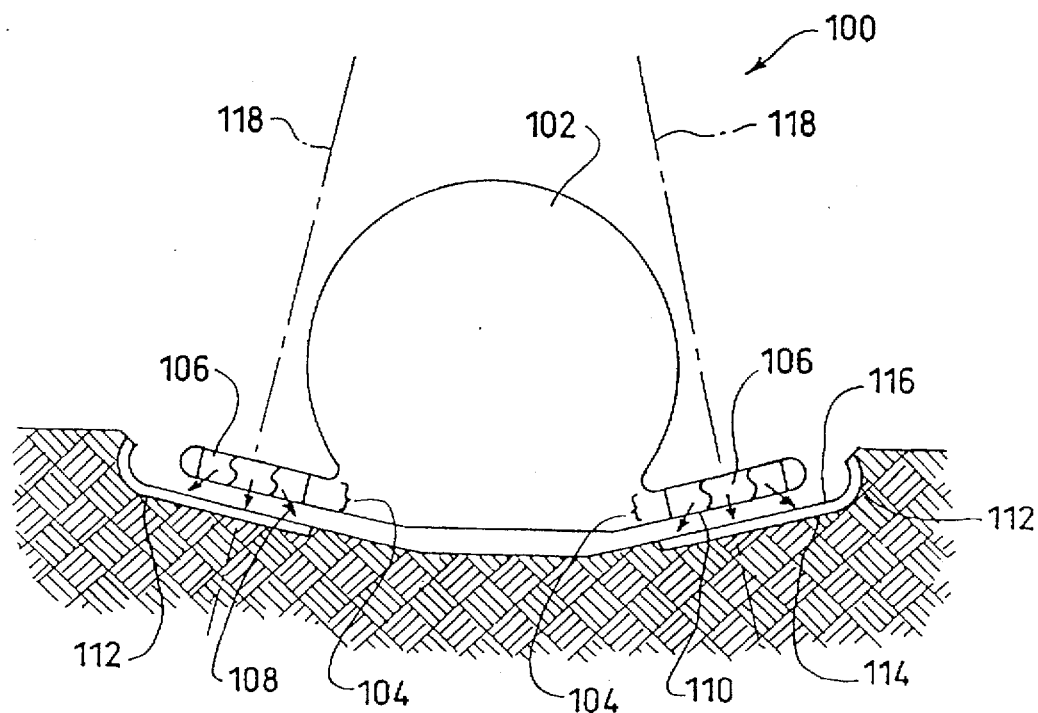
FIG. 6 is a schematic diagram of a cross section of a bearing structure for an electrodynamic levitation (EDL) magnetically levitated vehicle (Mag-Lev) in accordance with the present invention.

The present invention also provides stabilizing forces in journal bearing structure 80 of FIG. 5 and linear bearing structure 100 of FIG. 6. Referring to FIG. 5, the journal bearing structure 100 includes a stator assembly 82 containing two superconducting magnetic members 84 on opposing ends of a generally cylindrical rotor assembly 92. The superconducting magnetic members 84 are positioned to support two corresponding magnetic members 94 in a generally cylindrical rotor assembly 92 so that the thrust face 98 of each magnetic member 94 opposes the support face 90 of the superconducting magnetic member 84. The rotor assembly 92 is capable of a rotation movement which has a rotation axis parallel to the reference axis 96. In the journal bearing structure 80, the vibration displacements include those displacements of the rotor assembly 92 which are not parallel with the angular displacement associated with the rotational movement of the rotor assembly 92 around a fixed rotation axis while the rotor assembly 92 is suspended by the stator assembly 82. Thus, for example, the vibration displacements may include displacement resulting from magnetomechanical instabilities, rotor imabalances, or outside shocks to the storage system. As shown in FIG. 5, stabilizing forces to counteract with these vibration displacements are provided by providing the superconducting magnetic member 84 with at least one of the domain C-axis vectors 88 in the domains 86 are angularly disposed with respect to the reference axis 96.

Referring to FIG. 6, the bearing structure of the present invention may also be employed in a EDL Mag-Lev. In this case, the carrier assembly 102 contains the superconducting magnetic members 104 and the guideway assembly 112 contains the magnetic members 114 which are electromagnets. The carrier assembly 102 is levitated over the guideway assembly 112 so that the thrust face 116 of the magnetic members 112 opposes the support face 110 of the superconducting magnetic members 102. In the bearing structure 100 of FIG. 6, the vibration displacements include displacements of the carrier assembly 102 which are not parallel with the lateral displacement associated with the linear movement of the carrier assembly over the guideway assembly 112. Thus, for example, the vibration displacements include displacements resulting from magnetomechanical instabilities, such as coupled pitch and heave vibrations, coupled lateral and yaw vibrations and roll divergence. As shown in FIG. 6, control forces are provided to counteract these vibration displacements by providing domains 106 in the superconducting magnetic members 104 so that at least one of the domain C-axis vectors 108 is angularly disposed with respect to the reference axes 118 of the respective magnetic members 114.

Design of the spectra of domain C-axis vector angular dispositions should take into account the vibration displacement vectors to be controlled by the control force. For example, referring to FIGS. 3, 5 and 6, the vibration displacement vectors are different depending on whether the bearing structure is adapted for a thrust bearing system as shown FIG. 3, a journal bearing system as shown in FIG. 5 or a linear bearing system as shown in FIG. 6. As magnitudes of vibration displacement vectors orthogonal to the reference axes 66, 96 and 118 respectively increases, it is important to apply increased dampening to stop the undesirable displacement vectors. Small displacements, however, should be allowed, with little energy being removed. This will provide the rotor with a displacement window in which little or no energy is removed from the rotor; hence very low losses during normal rotor operation.

In addition, the performance of the HTS material should be considered in design. YBCO domains which have lower $J_c$ may be useful in tailoring the bearing system for the desired damping coefficient. HTS pellets of various strengths could be intermixed in a single HTS stator to achieve the desired result.

The advantages and other characteristics of the present invention are best illustrated by the following calculations.

Calculations were performed to illustrate the effects of the present invention in the thrust bearing structure shown in FIG. 1. The calculations are simplied because they are based on a reference flux line 120 of a magnetic field. In a real system the total damping and stiffness are dependent on the total flux change and flux density gradient, respectively. In addition, the calculations are based on a two-dimensional system.

Figure 7:
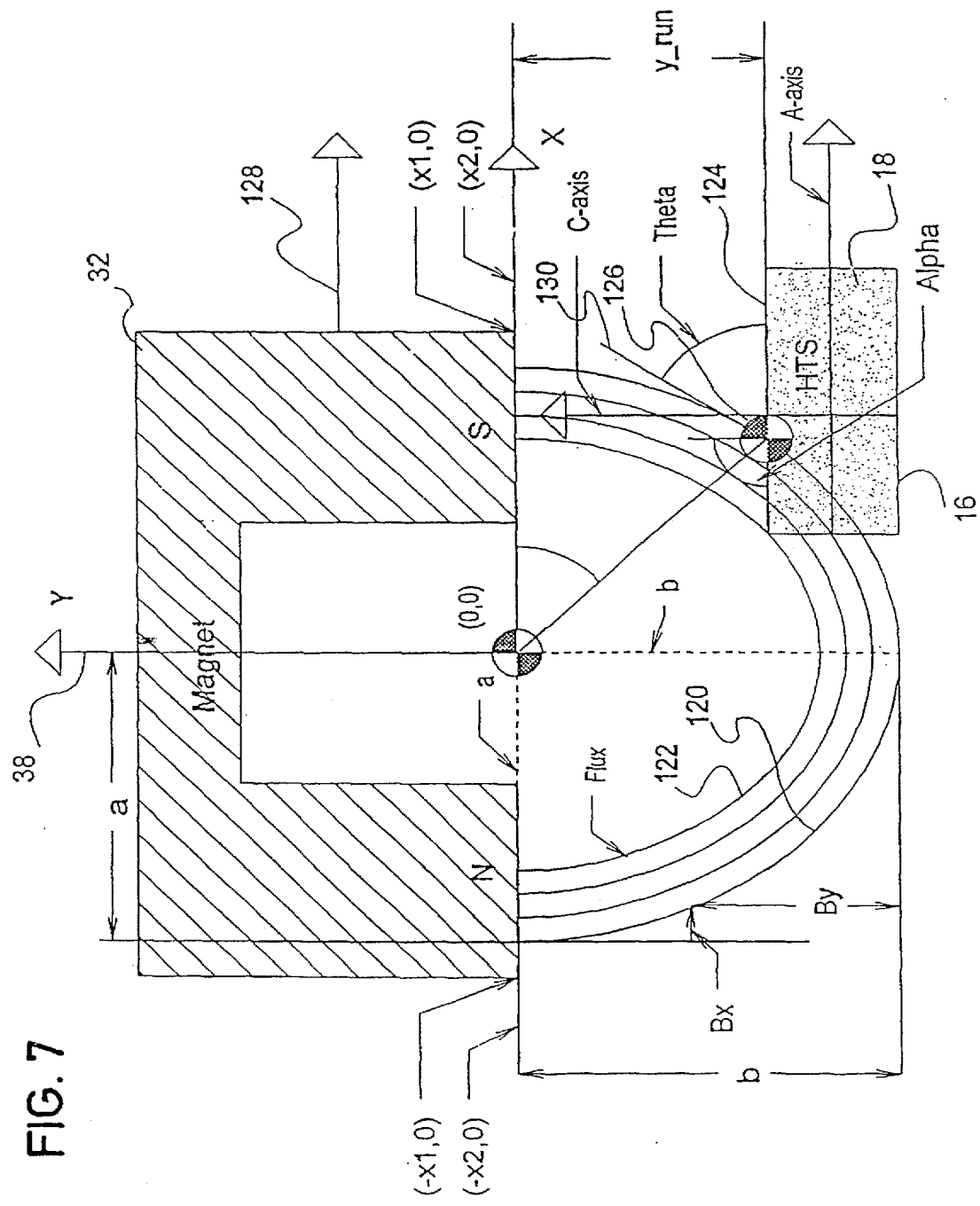
FIG. 7 is a section view of the bearing structure in FIG. 1.

FIG. 7 is a close-up view of the interaction between the magnetic member 32 and a portion of the superconducting magnetic member 14 in FIG. 1. In FIG. 7, the magnetic member 32 is suspended over a superconducting magnetic element 16 wherein the "Running Height" (y_run, height from superconducting magnetic element 16 to magnetic member 32) is 1.5. The effects of a displacement force 128 on magnetic member 32 is determined when the domain 18 of superconducting magnetic element 16 is aligned with the the magnetic member 32 in the conventional way and compared with the effects of displacement force 128 when the domain 18 is aligned in accordance with the present invention.

The magnetic member 32 is a "horse-shoe" shaped permanent magnet with North (N) and South (S) poles as shown. Flux lines 122 from the magnetic member 32 flow into a superconducting magnetic element 16 having a flat surface 124 that is perpendicular to the Y-coordinate. The reference flux line 120 intersects surface 124 at point 126. The angle Theta represents the incident flux angle, with reference to the X-coordinate, or the angle of tangent 130 of the reference flux line 120 at the point 126 relative to the surface 124. Theta can be caculated based on the arc-tangent of the flux gradient at the point of incidence.

As shown in FIG. 7, magnetic member 32 exhibits a magnetic field having components Bx and By, magnetic forces in the X and Y coordinates, respectively. The Y-coordinate is parallel to reference axis 38 and the X-coordinate is coincident with a line in the magnetic pole plane of magnetic member 32, such that the X- and Y-coordinates intersect at point (0,0) in FIG. 7. It is assumed that flux lines 122 define a portion of an ellipse with a center at point (0,0) and a first radius a and a second radius b such that a and b satisfy Equation II:

$$x^2/a^2 + y^2/b^2 + 1 \qquad \text{(EQUATION II)}$$

The present calculation uses y := y_run. In FIG. 7, the value of a is defined by the value of Bx and the shape of magnetic member 32, and the value of b is define by the value of By and the shape of magnetic member 32. In FIG. 7, it is assumed that a:=3.00 and b:=3.75.

The initial position of the magnetic member 32 when it begins to rotate above superconducting magnetic member 14 is referenced by the initial position of its south pole on the X-coordinate is denoted by $(x_1, 0)$ and its north pole on the X-coordinate is denoted by $(-x_1, 0)$. A displacement force 128 on the magnetic member 32 along the X-coordinate due to vibration results in a displacement (delta_x) of the magnetic member 32 wherein at a first point in time the position the south pole on the X-coordinate can be denoted by $(x_2, 0)$ and at a second point in time the position of the north pole on the X-coordinate can be denoted by $(-x_2, 0)$. It is assumed that the displacement of the magnetic member 32 is small in comparison to the scale of the overall system.

The superconducting magnetic element 16 consists of a pluarlity of domains with an A-axis and a C-axis. In FIG. 7, only one domain 18 is shown. The conventional positions of the A- and C-axes relative to the Y-coordinate are shown. In other words, the C-axis is parallel to the Y-coordinate. Angle Alpha represents the angle, with reference to the Y-coordinate, of the angular disposition of the C-axis with respect to the A-axis.

It is assumed the Bx and By are defined by a change in x. In addition, the critical current Jc of the superconducting magnetic member 16 in the A–B plane is 10 times that in the A–C plane. The calculations do not take into account for self shielding of the flux by the superconducting magnetic element 124.

Assuming that the displacement force 128 results in delta_x:=0.2, $X_2$ can be determined by Equation III:

$$x_2 := x_1 - x\_delta \qquad \text{(EQUATION III)}$$

so that $x_2 := 2.55$

The change in By (delta_By) as a function of x displacement can be determined by Equation IV:

$$\text{delta\_By} := b/a((a^2 - x_2^2)^{(1/2)} - (a^2 - x_1^2)^{(1/2)}) \qquad \text{(EQUATION IV)}$$

so that delta_By :=0.476

It is assumed that the critical field (B*) for the superconducting magnetic element 16 in the C-axis direction satisfies the formula: B*<1. In addition, it is assumed that the superconducting magnetic element 16 is operating in normal superconducting mode and thus below its critical field in the C-axis direction. Thus, the superconducting magnetic element 16 dissipates energy with field changes (ref_damp) approximated by Equation V:

$$\text{ref\_damp} := (\text{delta\_By})^3 / \text{Jc} \quad \text{(EQUATION V)}$$

so that ref_damp:=0.011

The value for change in flux (delta_flux) in a bearing wherein the C-axis vector is parallel to the tangent 130 of the reference flux line 120 at point 126 is calculated by Equation VI:

$$\text{delta\_flux} := \text{delta\_By} / \sin(\text{theta}) \quad \text{(EQUATION VI)}$$

so that delta_flux:=0.505

The ratio of the damping provided by the conventional method versus the damping provided by the present invention (damping_benefit) is expressed by Equation VII:

$$\text{damping\_benefit} := (\text{delta\_flux})^3 / (\text{delta\_By})^3 - 1 \quad \text{(EQUATION VII)}$$
so that damping_benefit := 18.832%

In addition the stiffness improvement can be demonstrated by assuming that stiffness is a linear behavior so that that stiffness is expressed by Equation VIII:

$$F = kX, \quad \text{(EQUATION VIII)}$$

where k is the stiffness coefficient.

In addition, it is assumed that delta_B is relatively small with respect to the initial field of the domain 18. Thus, stiffness benefit ratio (stiffness_benefit) can be expressed by Equation IX:

$$\text{stiffness\_benefit} := 1/\sin(\text{theta}) - 1 \quad \text{(EQUATION IX)}$$
so that stiffness_benefit := 5.92%

As shown by Equations VI and VII, the present invention provides increased damping and stiffness. The damping performance improves significantly as the ratio of b/a increase for the same running height. This is also true for larger running heights and higher flux gradient magnets.

As an example, a higher performance bearing system results from the following inputs:

a:=1.5;
b:=0.75
y_run:=0.50
delta_x:=0.20

The results of the calculation indicate a damping ratio improvement of 760% and stiffness improvement of 105% when compared to a similar system using domains 18 wherein the C-axis vector is parallel to the Y-coordinate.

Of course, it should be understood that a wide range of changes and modifications can be made to the preferred embodiment described above. It therefore is intended that the foregoing detailed description be regarded as illustrative rather than limiting and that it be understood that it is the following claims, including all equivalents, which are intended to define the scope of this invention.

What is claimed is:

1. A structure for magnetic bearings, comprising:
   a superconducting assembly comprising at least one superconducting magnetic member, said superconducting magnetic member having a support face and containing at least one domain, each of said domain including respective domain C-axis vectors;
   a magnetic assembly comprising at least one magnetic member, said magnetic member having a thrust face opposing said support face and including a reference axis having a direction perpendicular to said thrust face;
   a magnetic field between said superconducting assembly and said magnetic assembly, said magnetic field characterized by a plurality of flux lines, each of said flux lines intersecting said support face at an intersecting point, each of said flux lines having a flux slope at said intersecting point;
   said structure having an arrangement wherein said superconducting magnetic member includes at least one domain C-axis vector alignment angularly disposed relative to said reference axis, such that at least one of said C-axis vectors is aligned with at least one of said flux slope;
   said arrangement providing at least one stabilizing force.

2. The structure of claim 1 wherein the said superconducting magnetic member comprises a plurality of superconducting magnetic elements.

3. The structure of claim 2 wherein said superconducting magnetic member includes a plurality of arrays of superconducting magnetic elements wherein a first array is vertically positioned over a second array.

4. The structure of claim 1 wherein the domain C-axis vectors have a domain vector arrangement in the shape of a cone.

5. The structure of claim 2 wherein said superconducting magnetic element contains between three to ten domains.

6. The structure of claim 1 wherein each of said domain C-axis vector has an angular disposition $\alpha_1$ relative to the reference axis, said angular disposition $\alpha_1$ satisfies the formula $-9° < \alpha_1 < 90°$ and $\alpha_1 \neq 0°$.

7. The structure of claim 1 wherein said superconducting magnetic member comprises:
   a first domain having a first domain C-axis vector parallel to the reference axis;
   a second domain having a second domain C-axis vector having an angular disposition $\alpha$ relative to the reference axis such that $\alpha$ satisfies the formula:

$$0° < \alpha \leq 90°;$$

a third domain having a third domain C-axis vector having an angular disposition $\beta$ relative to the reference axis such that $\beta$ satisfies the formula:

$$-90° \leq \beta < 0°.$$

8. The structure of claim 7 wherein $\alpha = \text{abs}(\beta)$.
9. The structure of claim 7 wherein $\alpha < \text{abs}(\beta)$.
10. The structure of claim 7 wherein $\alpha > \text{abs}(\beta)$.
11. The structure of claim 1 wherein said superconducting member includes a plurality of superconducting magnetic elements forming an array wherein:
   a first superconducting magnetic element comprises:
      a first domain having a first domain C-axis vector parallel to the reference axis;
      a second domain having a second domain C-axis vector having an angular disposition $\alpha_2$ relative to the reference axis such that $\alpha_2$ satisfies the formula:

$$-90° \leq \alpha_2 < 0 \text{ or } 0 < \alpha_2 \leq 90°;$$

a third domain having a third domain C-axis vector having an angular disposition $\beta_2$ relative to the reference axis such that $\beta_2$ satisfies the formula:

$$-90° \leq \beta_2 < 0 \text{ or } 0 < \beta_2 \leq 90°;$$

a second superconducting magnetic element comprises:
  a fourth domain having a fourth domain C-axis vector parallel to the reference axis;
  a fifth domain having a fifth domain C-axis vector having an angular disposition $\alpha_3$ relative to the reference axis such that $\alpha_3$ satisfies the formula:

$$0° < \alpha_3 \leq 90°;$$

a sixth domain having a sixth domain C-axis vector having an angular disposition $\beta_3$ relative to the reference axis such that $\beta_3$ satisfies the formula:

$$-90° \leq \beta_3 < 0°.$$

12. The structure of claim 11 wherein $\alpha_2=\alpha_3$ and $\beta_2=\beta_3$.

13. The structure of claim 11 wherein $\alpha_2=\Theta_4+\alpha_3$ and $\beta_2=\beta_3-\Theta_4$ wherein $\Theta_4$ satisfies the formula:

$$0° < \Theta_4 \leq 90°.$$

14. The structure of claim 11 wherein $\alpha_2\Theta_4-\alpha_3$ and $\beta_2=\Theta_2+\beta_3$ wherein $\Theta_4$ satisfies the formula:

$$0° < \Theta_4 \leq 90°.$$

15. The structure of claim 1 wherein said arrangement is such that the domain C-axis vectors are azimuthally symmetric with respect to a plane containing the reference axis.

16. The structure of claim 1 wherein said arrangement is such that the domain C-axis vectors are azimuthally asymmetric with respect to the reference axis.

17. The structure of claim 1 wherein said magnetic member comprises a plurality of magnetic segments.

18. The structure of claim 1 wherein said superconducting assembly is capable of being levitated over said magnetic assembly.

19. The structure of claim 18 wherein said superconducting assembly is capable of lateral movement over said magnetic assembly.

20. The structure of claim 1 wherein said magnetic assembly is capable of being levitated over said superconducting assembly.

21. The structure of claim 20 wherein said magnetic assembly is capable of rotational movement, said magnetic assembly having a rotation axis in a direction parallel to the reference axis.

22. The structure of claim 21 wherein said magnetic assembly has a rotor shape selected from cylinder and cylindrical disc.

23. The structure of claim 22 wherein the superconducting assembly has a stator shape selected from cylinder and cylindrical disc, said stator shape having at least one radius.

24. The structure of claim 23 wherein said domain C-axis vectors along said radius have a C-axis vectorial sum direction that is azimuthally symmetric relative to said reference axis.

25. The structure of claim 23 wherein said C-axis vectors have a C-axis vectorial sum direction parallel to the flux slope.

26. The structure of claim 1 wherein:
  said domain C-axis vectors have a vectorial sum angle $\Theta_5$;
  said domain C-axis vectors are randomly disposed such that each of said domain C-axis vector has an angular disposition $\alpha_4$ relative to said reference axis such that $\alpha_4$ satisfies the formula:

$$\Theta_5-90° \leq \alpha_4 \leq \Theta_5+90°.$$

27. The structure of claim 26 wherein $\alpha_4$ satisfies the formula:

$$\Theta_5-10° \leq \alpha_4 \leq \Theta_5+10°.$$

28. The structure of claim 1 wherein:
  said domain C-axis vectors have a vectorial sum angle $\Theta_7$;
  said domain C-axis vectors are disposed in a statistically normal distribution having a mean distribution substantially equal to $\Theta_7$, wherein about 90% of the domain C-axis vectors have an angular disposition $\alpha_5$ satisfying the formula:

$$\Theta_7-15° \leq \alpha_5 \leq \Theta_7+15°.$$

29. The structure of claim 28 wherein about 90% of said domain C-axis vectors have an angular disposition $\alpha_5$ satisfying the formula:

$$\Theta_7-5° \leq \alpha_5 \leq \Theta_7+5°.$$

30. The structure of claim 3 wherein said superconducting magnetic elements in a first array disposed in a staggered formation relative to superconducting magnetic elements in a second array such that the superconducting magnetic elements in said first and second arrays form a brick-wall arrangement.

31. The structure of claim 1 wherein said superconducting magnetic member comprises a Type II superconducting material.

32. The structure of claim 31 wherein said Type II superconducting material comprises at least one material selected from $La_{1.85}Ba_{0.15}CuO_4$, $La_{1.85}Sr_{0.5}CuO_4$, $YBa_2Cu_3O_7$, $Bi_2Sr_2CaCu_2O_8$, $Bi_2Sr_2Ca_2Cu_3O_{10}$, $Tl_2Ba_2CaCu_2O_8$, $Tl_2Ba_2Ca_2Cu_2O_{10}$ and $HgBa_2Ca_2Cu_3O_{6+\delta}$.

33. A method for providing at least one stabilizing force in a magnetic bearing system including a superconducting assembly comprising at least one superconducting magnetic member, said superconducting member having a support face, and a magnetic assembly comprising at least one magnetic member, said magnetic member having a thrust face opposing said support face and including a reference axis having a direction perpendicular to said thrust face, wherein a magnetic field is formed between said superconducting assembly and said magnetic assembly said magnetic field characterized by a plurality of flux lines, each of said flux lines intersecting said support face at an intersecting point, each of said flux lines having a flux slope at said intersecting point, comprising:
  providing said superconducting magnetic member with at least one domain;
  arranging said superconducting magnetic member such that at least one domain has a domain C-axis vector alignment angularly disposed relative to said reference axis, such that at least one of said C-axis vectors is aligned with at least one of said flux slope.

34. A rotary bearing structure, comprising:
  a stator assembly comprising at least one superconducting magnetic member, said superconducting magnetic member having a support face, said superconducting magnetic member containing at least one domain, each of said domain including respective domain C-axis vectors;

a rotor assembly comprising at least one magnetic member, said magnetic member having a thrust face opposing said support face and including a reference axis having a direction perpendicular to said thrust face;

a magnetic field between said superconducting assembly and said magnetic assembly, said magnetic field characterized by a plurality of flux lines, each of said flux lines intersecting said support face at an intersecting point, each of said flux lines having a flux slope at said intersecting point;

said structure having an arrangement wherein said superconducting magnetic member includes at least one domain C-axis vector alignment angularly disposed relative to said reference axis, such that at least one of said C-axis vectors is aligned with at least one of said flux slope;

said arrangement providing at lest one stabilizing force.

35. The rotary bearing structure of claim 34 wherein said rotor assembly and said stator assembly are relatively disposed to function as a thrust bearing.

36. The rotary bearing structure of claim 34 wherein said rotor assembly and said stator assembly are relatively disposed to function as a journal bearing.

said arrangement providing at least one stabilizing force.

37. A bearing structure for an energy storage system comprising:

a rotor assembly comprising at least one permanent magnetic member, said rotor assembly having a rotation axis;

a stator assembly positioned to support said rotor assembly, said stator assembly comprising at least one high temperature superconducting magnetic member, said high temperature superconducting magnetic member containing at least one domain, each of said domain including respective domain C-axis vectors;

a magnetic field between said superconducting assembly and said magnetic assembly, said magnetic field characterized by a plurality of flux lines, each of said flux lines intersecting said support face at an intersecting point, each of said flux lines having a flux slope at said intersecting point;

said bearing structure having an arrangement wherein said stator assembly includes at least one domain C-axis vector alignment angularly disposed relative to said rotation, such that at least one of said C-axis vectors is aligned with at least one of said flux slope;

said arrangement providing at least one stabilizing force.

38. The structure of claim 1 wherein:

said flux slopes have a flux slope vectorial sum direction;

said domain C-axis vectors have a C-axis vectorial sum direction which is aligned with said flux slope vectorial sum direction.

39. The structure of claim 1 wherein:

said flux slopes have a flux slope vectorial sum direction;

said domain C-axis vectors have a C-axis vectorial sum direction which is parallel to said flux slope vectorial sum direction.

40. The structure of claim 3 wherein:

along any array of superconducting elements, said flux slopes have a flux slope vectorial sum direction;

said domain C-axis vectors have a C-axis vectorial sum direction which is aligned with said flux slope vectorial sum direction.

41. The structure of claim 40 wherein the C-axis vectorial sum direction is parallel to the reference axis.

* * * * *

UNITED STATES PATENT AND TRADEMARK OFFICE
CERTIFICATE OF CORRECTION

PATENT NO. : 5,747,426
DATED : May 5, 1998
INVENTOR(S) : Robert G. Abboud

It is certified that error appears in the above-identified patent and that said Letters Patent is hereby corrected as shown below:

In Claim 6, line 4, please change "9°" to --90°--.

In Claim 11, line 25, please change "°$\alpha_3 \leq 90°$;" to --0°$\alpha_3 \leq 90°$;--.

In Claim 33, line 10, after "assembly" please insert --,-- (comma).

In Claim 34, line 25, please change "lest" to --least--.

Signed and Sealed this

Twenty-third Day of January, 2001

Attest:

Attesting Officer

Q. TODD DICKINSON
Commissioner of Patents and Trademarks